(12) United States Patent
Schulz et al.

(10) Patent No.: US 12,246,899 B2
(45) Date of Patent: Mar. 11, 2025

(54) COMBINATION SQUARE PACKAGING

(71) Applicant: Klein Tools, Inc., Lincolnshire, IL (US)

(72) Inventors: Brian Schulz, Kenosha, WI (US); Sean O'Flaherty, Kenosha, WI (US); Alicia Shenal, Chicago, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 162 days.

(21) Appl. No.: 18/127,132

(22) Filed: Mar. 28, 2023

(65) Prior Publication Data
US 2024/0327087 A1  Oct. 3, 2024

(51) Int. Cl.
*B65D 73/00* (2006.01)
*G01B 3/56* (2006.01)

(52) U.S. Cl.
CPC ......... *B65D 73/0014* (2013.01); *G01B 3/566* (2013.01)

(58) Field of Classification Search
CPC ............ B65D 73/0085; B65D 73/0078; B65D 73/0071; B65D 73/0057; B65D 73/005; B65D 73/0042; B65D 73/0035; B65D 73/0021; B65D 73/0014; G01B 3/566
See application file for complete search history.

(56) References Cited

U.S. PATENT DOCUMENTS

| | | | | | |
|---|---|---|---|---|---|
| 2,831,573 | A | * | 4/1958 | Chermayeff | B65D 73/0014 206/463 |
| 5,174,446 | A | * | 12/1992 | Czopor, Jr. | B65D 73/0078 206/349 |
| 6,375,005 | B1 | * | 4/2002 | McCann | B65D 73/0064 206/349 |
| 6,464,840 | B1 | * | 10/2002 | McCann | B25H 3/04 206/349 |
| 6,547,073 | B1 | * | 4/2003 | Lee | B65D 73/0014 206/378 |
| 7,360,651 | B2 | * | 4/2008 | Kuo | B65D 73/0064 206/376 |
| 7,648,029 | B2 | * | 1/2010 | Chen | A47F 5/0006 211/70.6 |
| 9,346,608 | B2 | * | 5/2016 | Sublett | B27B 17/00 |
| 2005/0061757 | A1 | * | 3/2005 | Chiang | B65D 73/0064 211/70.6 |
| 2007/0007154 | A1 | * | 1/2007 | Wu | B65D 73/0064 206/349 |
| 2010/0270192 | A1 | * | 10/2010 | Ali | B65D 73/0014 206/372 |
| 2011/0272309 | A1 | * | 11/2011 | Miller | B65D 73/005 206/349 |
| 2011/0297568 | A1 | * | 12/2011 | Miller | B65D 73/0014 206/349 |
| 2012/0091074 | A1 | * | 4/2012 | Chang | B65D 73/0014 211/4 |
| 2016/0207681 | A1 | * | 7/2016 | Deshpande | B65D 73/0014 |

* cited by examiner

*Primary Examiner* — Chun Hoi Cheung

(57) ABSTRACT

A merchandise product is provided with a combination square having a head having a blade receiving slot and a blade releasably received in the blade receiving slot. The merchandise product includes a packaging card including a retainer structure configured to retain the head to the packaging card, a slot extending through the packaging card, and a retention member configured to pass through the slot and the blade. The retention member is configured to slide along a length of the slot and allow rotation of the blade about the retention member.

22 Claims, 5 Drawing Sheets

COMBINATION SQUARE PACKAGING

BACKGROUND OF THE DISCLOSURE

The present disclosure relates to packaging for combination squares having a head with a blade channel or slot and a ruled blade that is removably retained in the blade slot of the head at any position along the length of the blade. Such combination squares are well known. Typically, packaging for such combination squares do not allow a user to test features of the combination squares by sliding and rotating the blade relative to the head while both the blade and head of the combination square are retained to the packaging. It is desirable to allow users to test and observe features of said combination squares without requiring that the combination square be removed from the shelf packaging.

BRIEF SUMMARY OF THE DISCLOSURE

In accordance with one feature of this disclosure, a merchandise product includes a combination square having a head having a blade receiving slot and a blade releasably received in the blade receiving slot. The merchandise product includes a packaging card having a retainer structure configured to retain the head to the packaging card, a slot extending through the packaging card, and a retention member configured to pass through the slot and the blade. The retention member is configured to slide along a length of the slot and allow rotation of the blade about the retention member.

In one feature, the merchandise product includes a stop surface protruding from the packaging card to limit the rotation of the ruler.

According to one feature, the slot extends along a longitudinal axis and the stop surface extends at an acute angle relative to a longitudinal axis.

As one feature, the packaging card includes at least one pair of openings configured to allow a cable tie to affix the head to the packaging card.

In one feature, the head includes an internal cutout passing therethrough, the packaging card includes a protruding stop member having an outer geometry corresponding to an inner geometry of the internal cutout, and the protruding stop member engages the internal cutout to restrict movement of the combination square relative to the packaging card.

According to one feature, the combination square includes a scribe removably retained in the head, and the merchandise product includes a stop protruding from the packaging card to retain the scribe in the head.

As one feature, the retention member includes a screw and a shoulder washer. The screw is configured to pass through the blade and engage the shoulder washer. The shoulder washer includes hexagonal shoulder section having a diameter greater than a width of the slot and a protruding length receiving the screw. The protruding length is greater than a depth of the slot.

In one feature the retention member retains the blade to the packaging card.

In accordance with one feature of this disclosure a merchandise product includes a combination square including a head having a blade receiving slot and a blade releasably received in the blade receiving slot. The merchandise product includes packaging card including a retainer structure configured to retain the head to the packaging card, a slot extending through the packaging card, and a retention member configured to pass through the slot and the blade. The retention member is configured to allow rotation of the blade about the retention member.

In one feature the merchandise product includes a stop surface protruding from the packaging card to limit the rotation of the ruler.

As one feature, the slot extends along a longitudinal axis and the stop surface extends at an acute angle relative to a longitudinal axis.

In one feature the packaging card includes at least one pair of openings configured to allow a cable tie to affix the head to the packaging card.

According to one feature, the head includes an internal cutout passing therethrough, and the packaging card includes a protruding stop member having an outer geometry corresponding to an inner geometry of the internal cutout. The protruding stop member engages the internal cutout to restrict movement of the combination square relative to the packaging card.

As one feature, the combination square includes a scribe removably retained in the head, and the merchandise product further includes a stop protruding from the packaging card to retain the scribe in the head.

In one feature, the retention member comprises a screw and a shoulder washer, and the screw is configured to pass through the blade and engage the shoulder washer. The shoulder washer includes a hexagonal shoulder section having a diameter greater than a width of the slot and a protruding length receiving the screw. The protruding length is greater than a depth of the slot.

According to one feature, the retention member retains the blade to the packaging card.

In accordance with one feature of this disclosure, a merchandise product includes a combination square including a head having a blade receiving slot and a blade releasably received in the blade receiving slot. The merchandise product includes a packaging card including a retainer structure configured to retain the head to the packaging card, and a slot extending through the packaging card a retention member configured to pass through the slot and the blade. The retention member is configured to slide along a length of the slot.

According to one feature, the packaging card further includes at least one pair of openings configured to allow a cable tie to affix the head to the packaging card.

As one feature, the head includes an internal cutout passing therethrough, and the packaging card includes a protruding stop member having an outer geometry corresponding to an inner geometry of the internal cutout. The protruding stop member engages the internal cutout to restrict movement of the combination square relative to the packaging card.

In one feature, the combination square includes a scribe removably retained in the head. The merchandise product includes a stop protruding from the packaging card to retain the scribe in the head.

According to another feature, the retention member includes a screw and a shoulder washer. The screw is configured to pass through the blade and engage the shoulder washer. The shoulder washer comprises hexagonal shoulder section having a diameter greater than a width of the slot and a protruding length receiving the screw. The protruding length is greater than a depth of the slot.

As one feature, the retention member retains the blade to the packaging card.

It should be understood that the inventive concepts disclosed herein do not require each of the features discussed

DETAILED DESCRIPTION OF PREFERRED EMBODIMENTS

Figure 1:
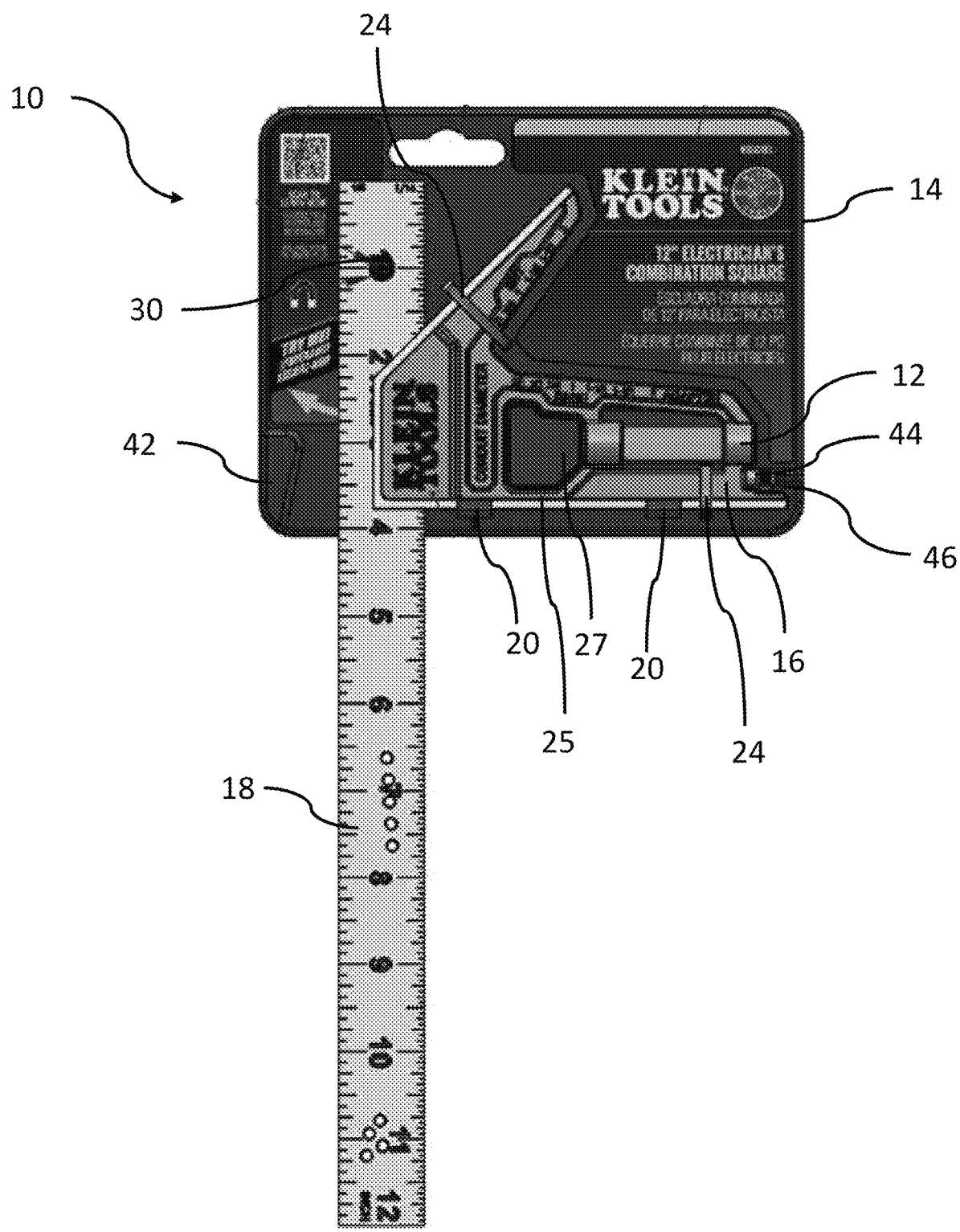
FIG. 1 is a front view a combination square and a packaging card.
Figure 2:
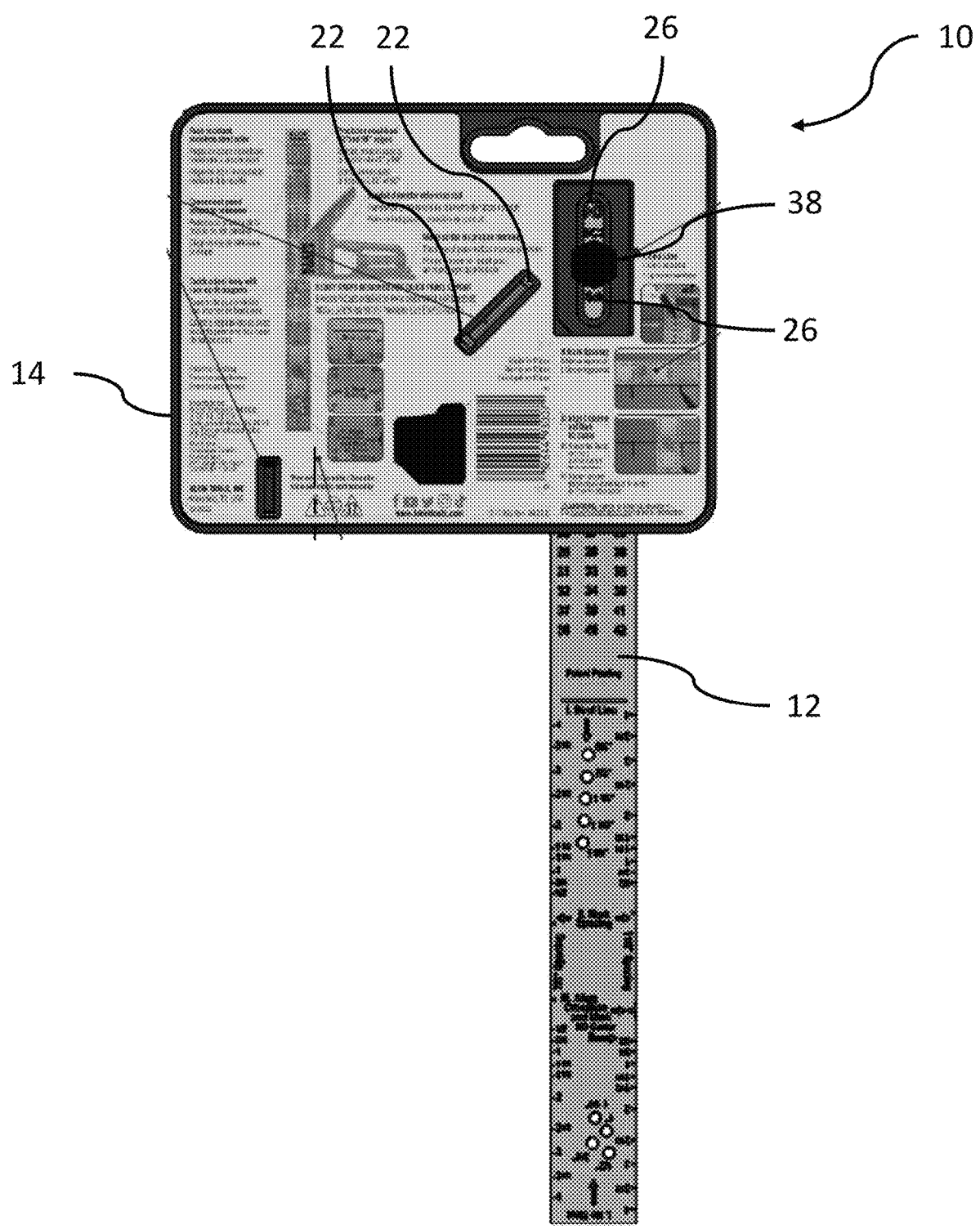
FIG. 2 is a back view of the combination square and packaging card of FIG. 1.
Figure 3:
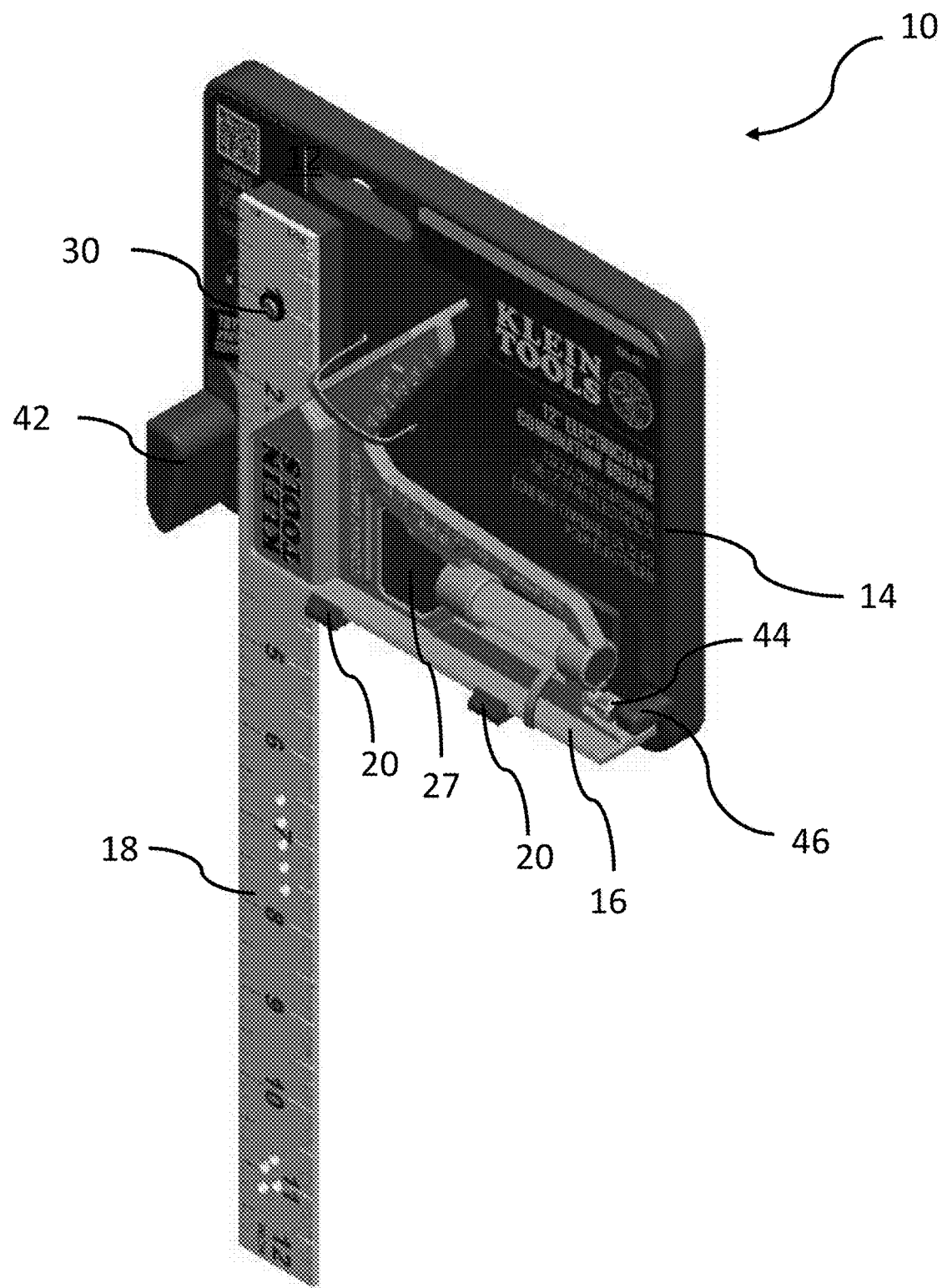
FIG. 3 is a perspective view of the combination square and packaging card of FIG. 1.

As shown in FIGS. 1-3, a merchandise product 10 including a combination square 12 and a packaging card 14 is provided. The combination square includes a square head 16 and a blade receiving channel or receiving slot that receives a ruled blade 18. In the illustrated and preferred embodiment, the head 16 includes one or more magnets to retain the blade 18. When not retained by the packaging card 14, a user may slide the blade 18 along the channel in the head 16 to a desired position or may completely remove the blade 18 from the head 16.

In the illustrated and preferred embodiment, the head 16 of the combination square 12 is retained to the packaging card 14 by retainer structure 20. The retainer structure 20 protrudes from the packaging card 14 and along the bottom of the head 16, and in the illustrated and preferred embodiment, includes a nub to retain the base 16 to the packaging card 14. In the illustrated and preferred embodiment, the packaging card 14 includes two pairs of openings 22 (best shown in FIG. 4) with each pair of openings 22 allowing a retainer shown in the form of a cable tie 24 to pass therethrough to retain the head 16 to the packaging card 14. In the illustrated and preferred embodiment, each cable tie 24 wraps around at least a portion of the head and passes through one of the pairs of openings 22.

In the illustrated and preferred embodiment, the head 16 of the combination square 12 includes an internal cutout 25 passing therethrough. The packaging card 14 includes a protruding stop member 27. The stop member 27 has an outer geometry (e.g., shape) substantially similar (e.g., corresponding) to the inner geometry (e.g., shape) of the internal cutout 25. The stop member 27 protrudes such that it engages the sides of the internal cutout 25 to prevent lateral movement of the head 16 relative to the packaging card 14.

Figure 4:
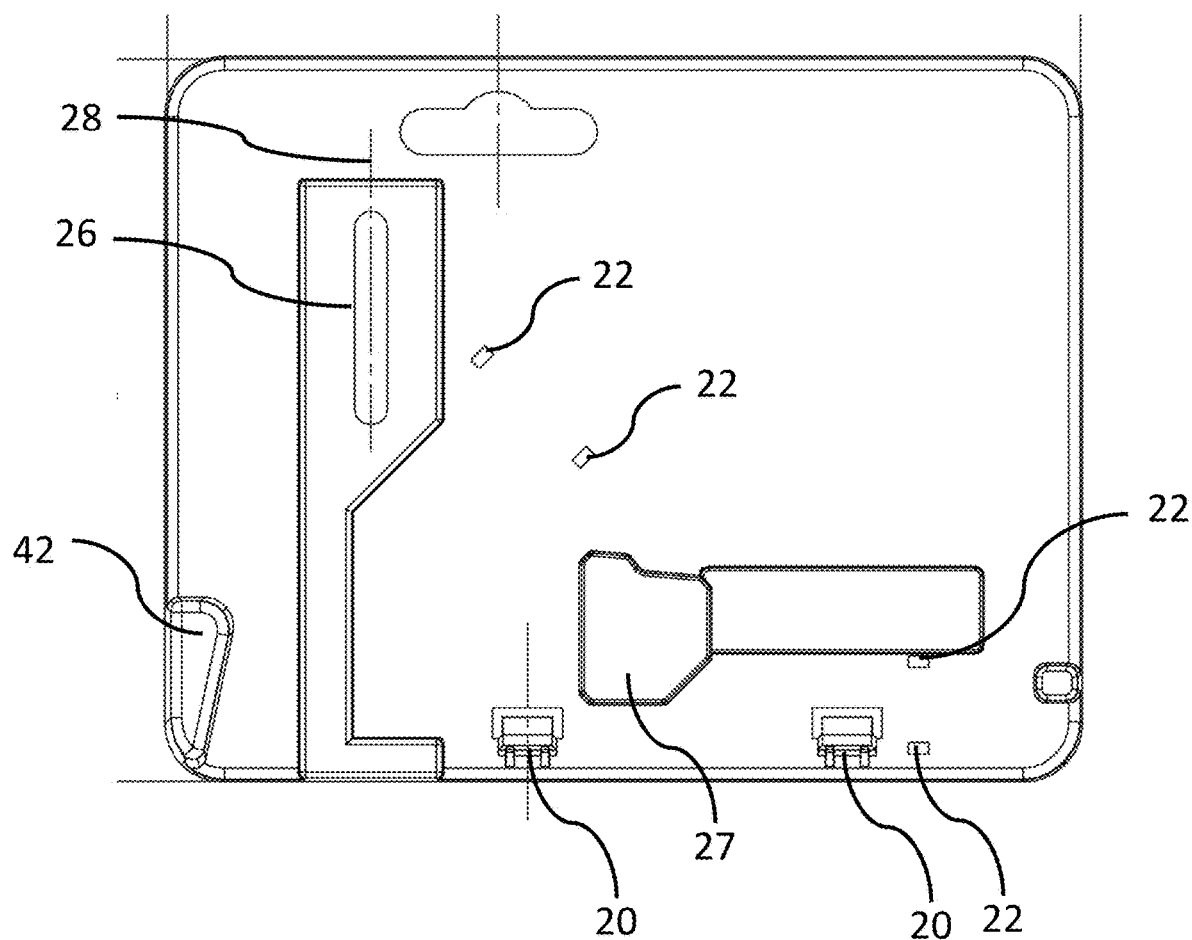
FIG. 4 is front view of the packaging card of FIG. 1.
Figure 5:
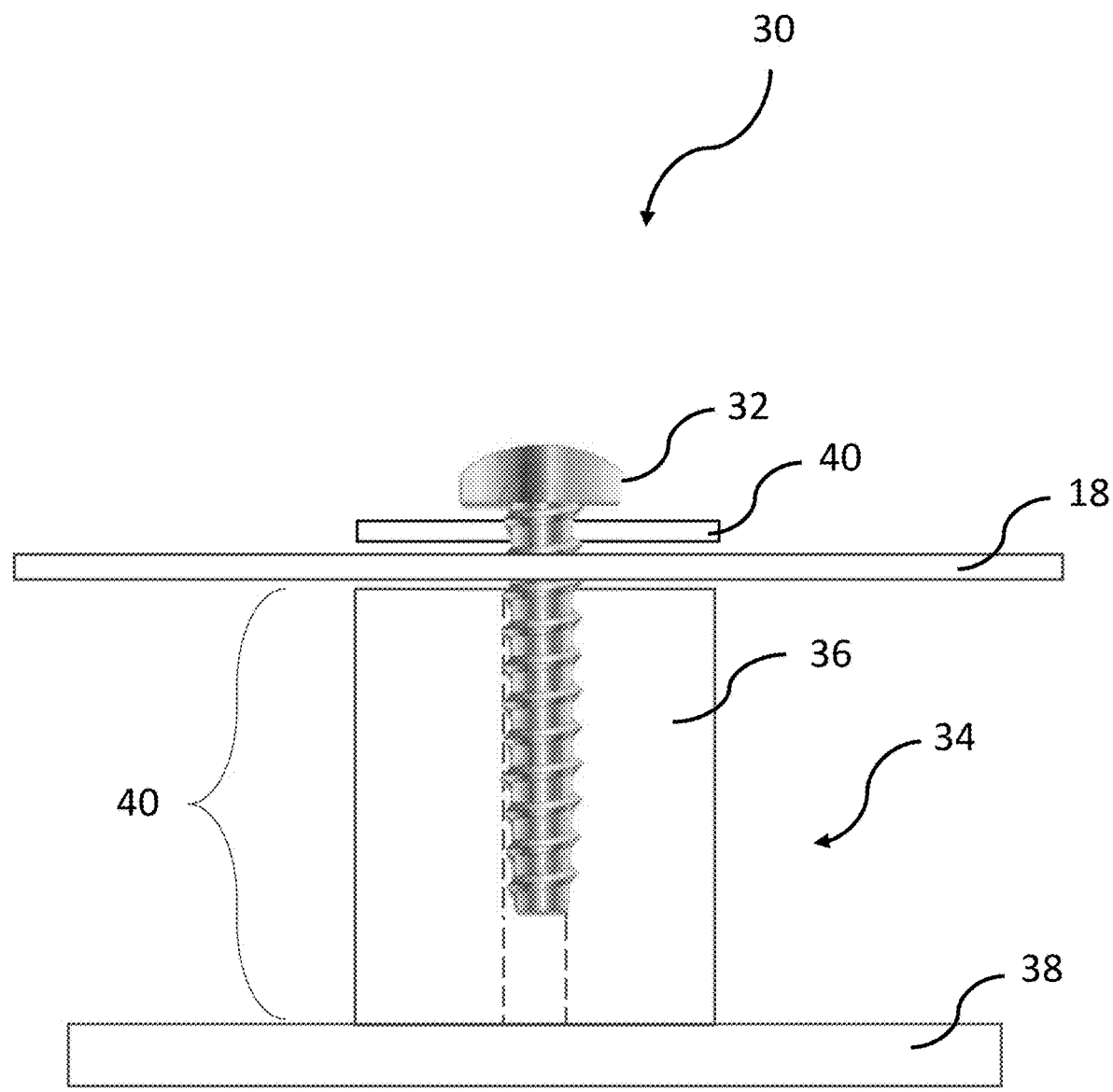
FIG. 5 is a section view of a portion of the combination square and packaging card of FIG. 1.

As best shown in FIG. 4, in the illustrated and preferred embodiment, the packaging card 14 includes an elongated slot 26 extending along a longitudinal axis 28. In the illustrated and preferred embodiment, the merchandise product 10 includes a retention member 30 to retain the blade 18 to the packaging card 14. In the illustrated and preferred embodiment, retention member 30 passes through a hole in the blade 18 and the slot 26. FIG. 5 best shows the retention member 30 and the blade 18. As shown in FIG. 5, the retention member 30 includes a screw 32 and a shoulder washer 34. In the illustrated and preferred embodiment, the shoulder washer 34 includes an elongated shaft 36 (e.g., shank) and hexagonal washer head 38. The screw passes through a hole in the blade 18 and is screwed into the shaft 36 of the shoulder washer 34. In the illustrated and preferred example, a length 40 of the shaft 36 is greater than a depth of the packaging card 14. In such examples, the length 40 of the shaft 36 being greater than the depth of the packaging card 14 allows the screw 32 to be fully tightened against the blade 18 (e.g., tightened with the blade 18 between the head of the screw 32 and the shoulder washer 34) without the hexagonal washer head 38 tightening against the packaging card 14. The length 40 of the shaft 36 being greater than the depth of the packaging card 14 allows the screw 32 allows for the blade 18 and the retention member 30 to slide along the slot 26 of the packaging card 14. In the illustrated and preferred embodiment, the retention member 30 includes a washer 40 positioned between the head of the screw 32 and the blade 18.

In the illustrated and preferred embodiment, the shaft 36 has an oval shape. The oval shape prevents complete rotation of the shoulder washer 34 in the slot 26, allowing the screw 32 to be tightened or loosened to the shoulder washer 34. Further, the washer head 38 has a hexagonal shape, allowing a wrench or driver having a hexagonal portfolio to grip the washer head 38 to prevent or limit rotation of shoulder washer 34 during tightening to loosening of the screw 32.

In the illustrated and preferred embodiment, the retention member 30 slides along a length of the slot 26. This sliding motion, for example, allows a user to test sliding features of the combination square 12. The user may grip the blade 18 and slide the blade relative to the head 16. The retention member 30 allows the blade 18 slide until the retention member reaches either end of the slot 26.

In the illustrated and preferred embodiment, the combination square 12 is a magnetic combination square. The combination square 12 retains the blade 18 to the head 16 using magnets. Magnets allow a user to completely remove the blade 18 from the head 16 by pulling the blade 18 away from the head 16. In the illustrated and preferred embodiment, the retention member 30 retains the blade 18 to the packaging card 14. In such an example, the retention member 30 prevents a user from removing the blade from the packaging card without removing the screw 32. In the illustrated and preferred embodiment, the shaft 36 of the retention member 30 may at least partially rotate within the slot 26. The illustrated and preferred embodiment of the packaging card 14 includes a stop surface 42 protruding therefrom. The stop surface 42 protrudes from the packaging card 14 such that it limits rotation of the blade 18 about the retention member 30. As best shown in FIG. 4, in the illustrated and preferred embodiment, the stop surface 42 extends at an acute angle relative to the longitudinal axis 28 (e.g., the axis along the length of the slot 26). As an example, a user may test the removability of the blade 18 from the head 16 by rotating the blade about the retention member 30. The stop surface 42 limits this rotation and prevents the user from removing the blade 18 from the packaging (e.g., packaging card 14) further than desired.

In the illustrated and preferred embodiment, the combination square 12 includes a scribe 44. The scribe 44 is removably retained in the head 16 of the combination square 12. The scribe 44 is typically friction fit and may be removed from the head 16 by pulling on the end of the scribe 44. In the illustrated and preferred embodiment, the packaging card 14 includes a stop 46 protruding therefrom. In the illustrated and preferred embodiment, the stop 26 protrudes from an edge of the packaging card 14 and retains the scribe 44 in the head 16. More specifically, the stop 46 retains the scribe in the head and prevents a user from removing the scribe from the head 14. Further, in some examples the stop 46 limits lateral movement of the head 14 relative to the packaging card 14.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the merchandise product 10 are shown in the figures, it should be understood that this disclosure anticipates variations in the specific details of each of the disclosed components and features of the material dispenser and that no limitation to a specific form, configuration, or detail is intended unless expressly and specifically recited in an appended claim.

For example, while specific and preferred forms have been shown for the retention member 30, other forms of retention members that retain the blade 18 to the packaging card 14 may be used. For example, while the shaft 36 disclosed as being oval, other forms may be used, such as a round shaft. As another example, while the head 38 is shown as having a hexagonal shape, other types of heads such as round heads may be used. In some examples the retention member 30 include be a zip tie.

As a further example, while the stop surface 42 is shown extending along an acute angle relative to the longitudinal axis 28, in some examples a stop surface may extend parallel to the longitudinal axis 38. In some examples a stop surface may be circular or oval.

As another example of alternative embodiments, while the illustrated embodiments show the packaging card 14 having an elongated slot 26, alternative embodiments may have a hole instead of a slot. In such examples, the blade 18 may pivot about the retention member 30 in said hole.

As yet another example, while the illustrated embodiment includes retainer structure 20 to retain the head 16 of the combination square 12 to the packaging card 14, some examples may not include such retainer structure. Many ways of retaining the head 16 of the combination square 12 to the packaging card 14 are known in the art.

As a further example, while the shaft 36 of the illustrated and preferred example has an oval shape, some shaft 26 examples may have other shapes such as round, square, rectangular, hexagonal, or other geometric shapes. Further, while the washer head 38 is disclosed as having a hexagonal shape, other shapes may be used (e.g., round, square, etc).

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

What is claimed is:

1. A merchandise product comprising:
   a combination square including a head having a blade receiving slot and a blade releasably received in the blade receiving slot;
   a packaging card including
      a retainer structure configured to retain the head to the packaging card;
      a slot extending through the packaging card;
      a retention member configured to pass through the slot and the blade,
   wherein the retention member is configured to slide along a length of the slot and allow rotation of the blade about the retention member.

2. The merchandise product of claim 1, further including a stop surface protruding from the packaging card to limit the rotation of the ruler.

3. The merchandise product of claim 2, wherein the slot extends along a longitudinal axis and the stop surface extends at an acute angle relative to a longitudinal axis.

4. The merchandise product of claim 1, wherein the packaging card further includes at least one pair of openings configured to allow a cable tie to affix the head to the packaging card.

5. The merchandise product of claim 1, wherein:
   the head includes an internal cutout passing therethrough;
   the packaging card includes a protruding stop member having an outer geometry corresponding to an inner geometry of the internal cutout; and
   the protruding stop member engages the internal cutout to restrict movement of the combination square relative to the packaging card.

6. The merchandise product of claim 1, wherein the combination square comprises a scribe removably retained in the head, the merchandise product further comprising a stop protruding from the packaging card to retain the scribe in the head.

7. The merchandise product of claim 1, wherein the retention member comprises a screw and a shoulder washer, wherein:
   the screw is configured to pass through the blade and engage the shoulder washer;
   the shoulder washer comprises hexagonal shoulder section having a diameter greater than a width of the slot and a protruding length receiving the screw, wherein the protruding length is greater than a depth of the slot.

8. The merchandise product of claim 1, wherein the retention member retains the blade to the packaging card.

9. A merchandise product comprising:
   a combination square including a head having a blade receiving slot and a blade releasably received in the blade receiving slot;

a packaging card including
a retainer structure configured to retain the head to the packaging card;
a slot extending through the packaging card;
a retention member configured to pass through the slot and the blade,
wherein the retention member is configured to allow rotation of the blade about the retention member.

10. The merchandise product of claim 9, further including a stop surface protruding from the packaging card to limit the rotation of the ruler.

11. The merchandise product of claim 10, wherein the slot extends along a longitudinal axis and the stop surface extends at an acute angle relative to a longitudinal axis.

12. The merchandise product of claim 9, wherein the packaging card further includes at least one pair of openings configured to allow a cable tie to affix the head to the packaging card.

13. The merchandise product of claim 9, wherein:
the head includes an internal cutout passing therethrough;
the packaging card includes a protruding stop member having an outer geometry corresponding to an inner geometry of the internal cutout; and
the protruding stop member engages the internal cutout to restrict movement of the combination square relative to the packaging card.

14. The merchandise product of claim 9, wherein the combination square comprises a scribe removably retained in the head, the merchandise product further comprising a stop protruding from the packaging card to retain the scribe in the head.

15. The merchandise product of claim 9, wherein the retention member comprises a screw and a shoulder washer, wherein:
the screw is configured to pass through the blade and engage the shoulder washer;
the shoulder washer comprises hexagonal shoulder section having a diameter greater than a width of the slot and a protruding length receiving the screw, wherein the protruding length is greater than a depth of the slot.

16. The merchandise product of claim 9, wherein the retention member retains the blade to the packaging card.

17. A merchandise product comprising:
a combination square including a head having a blade receiving slot and a blade releasably received in the blade receiving slot;
a packaging card including
a retainer structure configured to retain the head to the packaging card;
a slot extending through the packaging card;
a retention member configured to pass through the slot and the blade,
wherein the retention member is configured to slide along a length of the slot.

18. The merchandise product of claim 17, wherein the packaging card further includes at least one pair of openings configured to allow a cable tie to affix the head to the packaging card.

19. The merchandise product of claim 17, wherein:
the head includes an internal cutout passing therethrough;
the packaging card includes a protruding stop member having an outer geometry corresponding to an inner geometry of the internal cutout; and
the protruding stop member engages the internal cutout to restrict movement of the combination square relative to the packaging card.

20. The merchandise product of claim 17, wherein the combination square comprises a scribe removably retained in the head, the merchandise product further comprising a stop protruding from the packaging card to retain the scribe in the head.

21. The merchandise product of claim 17, wherein the retention member comprises a screw and a shoulder washer, wherein:
the screw is configured to pass through the blade and engage the shoulder washer;
the shoulder washer comprises hexagonal shoulder section having a diameter greater than a width of the slot and a protruding length receiving the screw, wherein the protruding length is greater a depth of the slot.

22. The merchandise product of claim 17, wherein the retention member retains the blade to the packaging card.

* * * * *